G. PAYNE.
METHOD OF FORMING CELL CASES.
APPLICATION FILED AUG. 20, 1917.
1,333,772.
Patented Mar. 16, 1920.
2 SHEETS—SHEET 1.
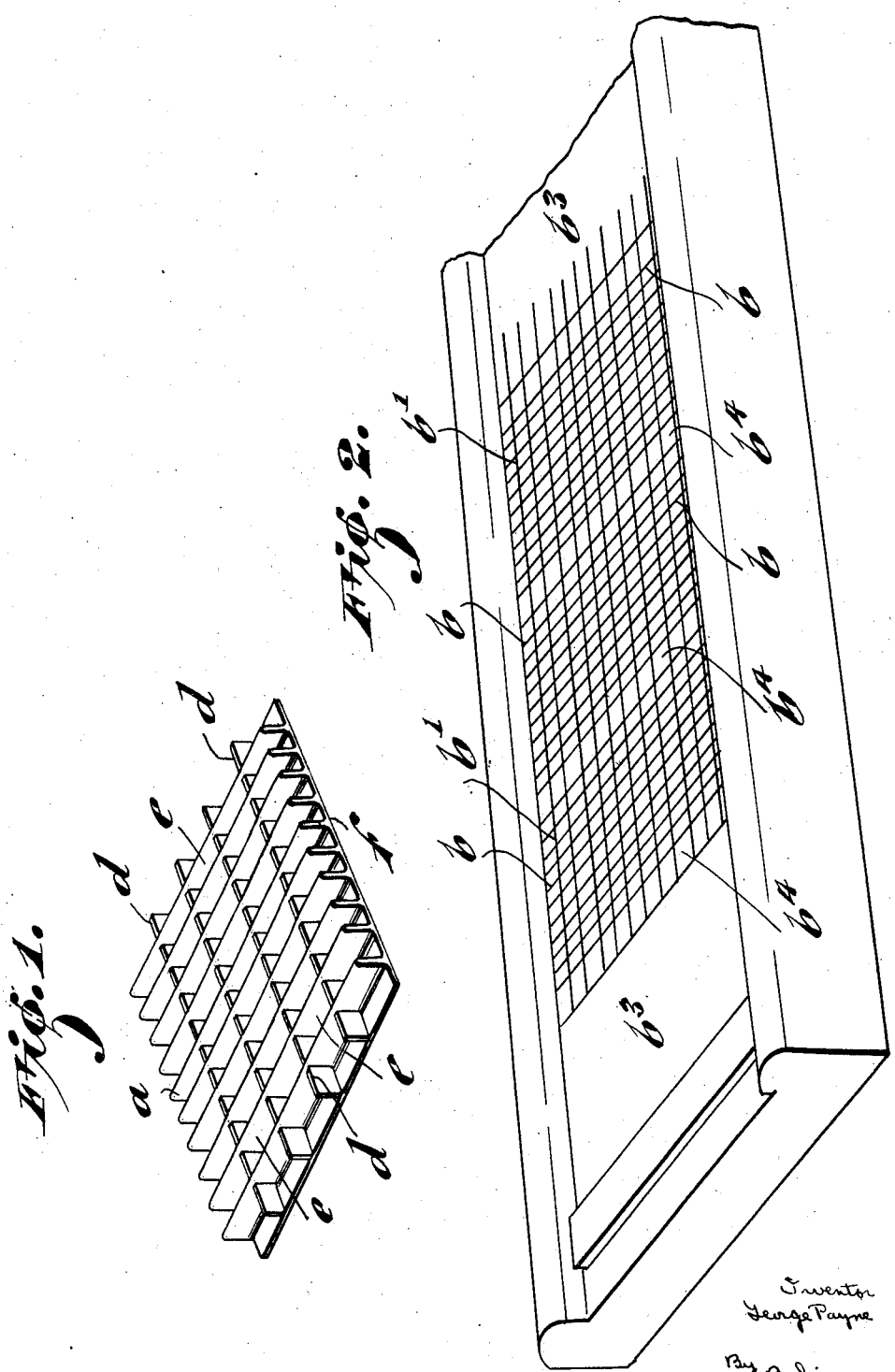

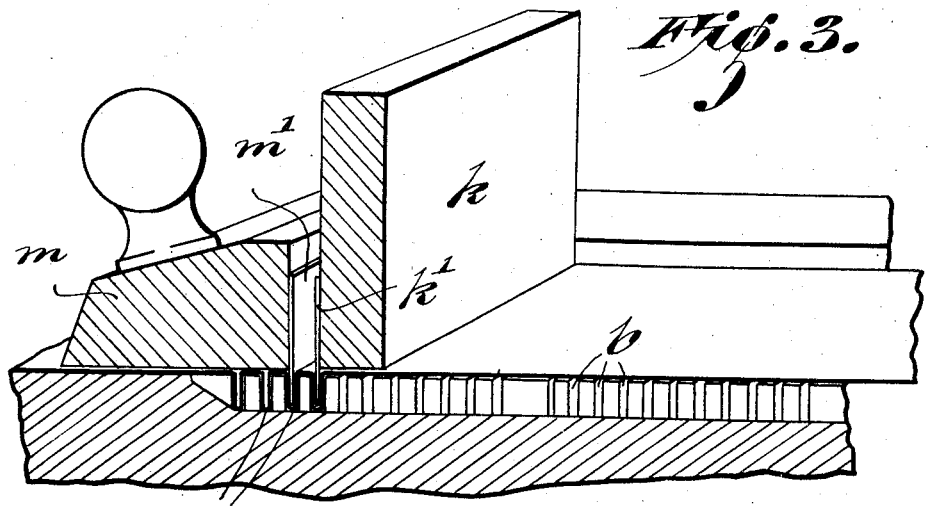
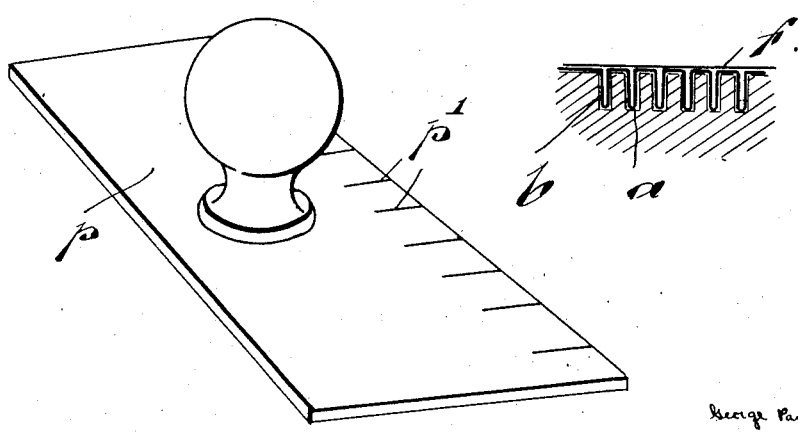

UNITED STATES PATENT OFFICE.

GEORGE PAYNE, OF BIRMINGHAM, ENGLAND, ASSIGNOR TO J. B. DYSON & SON, LIMITED, OF BIRMINGHAM, ENGLAND.

METHOD OF FORMING CELL-CASES.

1,333,772.  Specification of Letters Patent.  Patented Mar. 16, 1920.

Application filed August 20, 1917. Serial No. 187,185.

*To all whom it may concern:*

Be it known that I, GEORGE PAYNE, a subject of the Kingdom of Great Britain, residing at 16 New Bartholomew street, Birmingham, in the county of Warwick, England, have invented a certain new and useful Method of Forming Cell-Cases, of which the following is a specification.

This invention relates to the packing of small articles, and which is particularly applicable in the case of small coiled springs, which if not separated from each other in the packing are liable to become entangled and damaged, while the disengaging of the one from the other when required for use necessitates a considerable amount of time which is wasted, the arrangement also being applicable in connection with any small articles in which it is desired that such articles shall not be shaken against each other in the course of transit, such means consisting of forming longitudinal partitions by corrugating paper of sufficient stiffness, this being effected in a suitable plate or board having grooves into which the paper is forced by sheet metal pressers, after which the partitions are cut through transversely to allow of the insertion of lateral strips of stiff paper or thin cardboard, the plate or board being provided with grooves or saw cuts for enabling such transverse cutting of the longitudinal partitions, and the insertion of the strips to be effected, the whole being secured together and stiffened by pasting or gumming a stiff sheet of paper or thin cardboard over the whole of the back of the receptacle thus formed.

In order that this invention may be clearly understood and readily carried into practice, reference may be had to the appended sheet of drawings, upon which:—

Figure 1 is a view of the device for effecting the packing of articles, such view being shown in section at one end.

Fig. 2 is a view of a board suitable for effecting the manufacture of the packing device.

Fig. 3 is an enlarged longitudinal sectional view of part of Fig. 2, illustrating the process of manufacturing the device, the section being taken along the line of one of the longitudinal grooves.

Fig. 4 is a similar section in part to that shown in Fig. 2, but illustrating the insertion of the lateral strips.

Fig. 5 is a similar longitudinal section to that of Fig. 4, but taken on a line between the longitudinal grooves and illustrating the addition of the backing.

Fig. 6 is a view of a device for registering the position of the grooves when cutting the corrugations.

In an embodiment of this invention the longitudinal partitions $a$ are formed by being pressed from a sufficiently stiff piece of paper into the grooves $b$ formed in a suitable board, such board being provided with a series of cuts $b^1$ of sufficient width to allow of a knife being drawn through same. Strips of paper or cardboard $d$ of suitable stiffness and depth are then inserted into the cuts, thus forming a series of square or oblong receptacles $e$ both laterally and longitudinally divided from each other, a sheet of paper or cardboard $f$ of suitable stiffness being adhesively secured over the whole surface which forms the bottom of the receptacles prior to the arrangement being removed from the plate.

By this means the whole of the reverse side of the device to that to which the sheet of paper or cardboard $f$ is adhesively attached is provided with a series of receptacles or recesses $e$ which are in parallel rows both longitudinally and laterally, and into each of which recesses or receptacles $e$ the articles to be packed can readily be inserted or removed, and are kept entirely separate from contact with each other.

The transverse cuts $b^1$ are of less depth than the grooves $b$ in which the longitudinal partitions are formed, so that when the knife is drawn through the transverse cuts $b^1$ of the board, a small portion of the longitudinal partitions $a$ at the bottom is not severed, the strips $d$ in such case being slightly less in depth than the depth of the recess.

The board $b^3$ as shown in Fig. 2, is one in which a series of three packing devices, such as illustrated in Fig. 1, can be made by one process, such devices being severed from each other at $b^4$, the process of forming the device being as follows:—

A strip of paper of the required stiffness, width and length is placed upon the board $b^3$ and held in position at one end while the corrugation is effected by forcing the paper into the first groove by a sheet metal flange $k^1$ of a presser such as $k$, the presser $k$ is then withdrawn and the flange $m^1$ of a similar presser such as $m$ is inserted to retain the paper in the groove $b$ into which it has been pressed, while the flange $k^1$ of the presser $k$ is caused to force the paper into the next groove, and so on, step by step into each groove of the board.

The strip of wood or cardboard $p$ which is marked at $p^1$ with the positions of the cuts $b^1$ is then placed on the board at the one end of the paper, and a sharp knife is drawn along from one end to the other of the saw cuts $b^1$, thus cutting through the paper and the partitions $a$, after which the strips of paper or cardboard $d$ are inserted into the respective cuts, such strips being of a suitable length for each of the series of devices which are being formed on the board. The sheet of paper or cardboard $f$ of suitable stiffness being then adhesively secured over the whole surface, after which the device can be withdrawn from the grooves and saw cuts in the form illustrated by Fig. 1.

The material from which the corrugations forming the partitions, as also the division strips and backing are made may be varied, so long as that for the corrugations is sufficiently flexible to allow the partitions to be formed and is capable of being readily cut.

What I claim as my invention and desire to secure by Letters Patent is:—

The method of making a compartment package, consisting in placing a sheet of material on a forming board having spaced grooves in its face and also having grooves intersecting the first named grooves pressing the material into the first named grooves to form spaced ridges in the same, cutting grooves transversely across said ridges by means of a tool guided in the second named grooves of the forming board, inserting strips of material in said second named grooves and in the cuts in the ridges while the said ridges are in the said first named grooves, and securing a reinforcing sheet on the first named sheet and while the ridges of said first named sheet and said strips are in the grooves of the forming board, so that said reinforcing sheet extends across the outer edges of said strips.

In witness whereof I have hereunto set my hand in the presence of two witnesses.

GEORGE PAYNE.

Witnesses:
ARTHUR H. BROWN,
EDGAR N. WHEELER.